United States Patent
Yoon et al.

(10) Patent No.: US 6,391,497 B1
(45) Date of Patent: May 21, 2002

(54) CARBONACEOUS MATERIAL FOR NEGATIVE ELECTRODE OF LITHIUM SECONDARY BATTERY AND LITHIUM SECONDARY BATTERY MANUFACTURED BY THE SAME

(75) Inventors: Sang-young Yoon, Chonan-si (KR); Ryoji Mishima, Youkihanashi; Toshiaki Tsuno, Kanagawaken, both of (JP)

(73) Assignee: Samsung Display Devices Co., Ltd. (KR)

(*) Notice: Subject to any disclaimer, the term of this patent is extended or adjusted under 35 U.S.C. 154(b) by 0 days.

(21) Appl. No.: 09/303,228

(22) Filed: Apr. 30, 1999

(30) Foreign Application Priority Data

May 1, 1998 (JP) .......................................... 10-137664

(51) Int. Cl.[7] .......................... H01M 4/58; H01M 4/60
(52) U.S. Cl. .............................. 429/231.8; 429/218.1; 429/212; 429/223
(58) Field of Search .................. 429/231.8, 218.1, 429/212, 223

(56) References Cited

U.S. PATENT DOCUMENTS

| | | | |
|---|---|---|---|
| 3,926,671 A | * | 12/1975 | Gutjahr et al. ............... 136/29 |
| 3,944,434 A | * | 3/1976 | Groppel et al. ............... 136/86 |
| 4,251,344 A | * | 2/1981 | Needes ....................... 204/290 |
| 4,298,666 A | * | 11/1981 | Taskier ....................... 429/206 |
| 5,264,302 A | * | 11/1993 | Sonneveld .................... 429/67 |
| 5,480,741 A | * | 1/1996 | Sakai et al. .................. 429/59 |
| 5,518,842 A | * | 5/1996 | Fey et al. .................... 429/218 |
| 5,636,437 A | * | 6/1997 | Kaschmitter et al. ......... 29/825 |
| 5,776,610 A | * | 7/1998 | Yamada et al. .............. 428/403 |
| 5,795,679 A | * | 8/1998 | Kawakami et al. ......... 429/218 |
| 5,922,491 A | * | 7/1999 | Ikawa et al. ................. 429/218 |
| 5,963,417 A | * | 10/1999 | Anderson et al. ........... 361/503 |
| 5,965,296 A | * | 10/1999 | Nishimura et al. ...... 429/231.8 |
| 6,022,518 A | * | 2/2000 | Yamazaki et al. .......... 423/448 |
| 6,106,978 A | * | 8/2000 | Takeuchi .................... 429/235 |
| 6,218,050 B1 | * | 4/2001 | Yoon et al. .............. 429/231.8 |

* cited by examiner

*Primary Examiner*—Tom Dunn
*Assistant Examiner*—Lie Edmundson
(74) *Attorney, Agent, or Firm*—Blakely Sokoloff Taylor & Zafman

(57) ABSTRACT

Disclosed is carbonaceous material for a negative electrode of a lithium secondary battery which reduces an irreversible capacity and increases a discharge capacity of the battery. A surface of carbon particles of the negative electrode is coated with a porous nickel thin film, wherein the nickel film comprises 0.05% by weight to 1.0% by weight of the carbonaceous material.

4 Claims, 2 Drawing Sheets

CARBONACEOUS MATERIAL FOR NEGATIVE ELECTRODE OF LITHIUM SECONDARY BATTERY AND LITHIUM SECONDARY BATTERY MANUFACTURED BY THE SAME

CROSS REFERENCE TO RELATED APPLICATION

This application is based on application Ser. No. 10-137664 filed in the Japan Patent Office on May 1, 1998, the content of which is incorporated hereinto by reference.

BACKGROUND OF THE INVENTION (a) Field of the Invention

This invention relates to a negative electrode in a lithium secondary battery, and more particularly to a carbonaceous material for a negative electrode in a lithium secondary battery which reduces an irreversible capacity of a first cycle and increases a discharge capacity of the battery.

(b) Description of the Related Art

In recent years, with the increasing performance and portability of electronic equipment, it is necessary for secondary batteries used in the equipment to have high levels of energy density. A lithium secondary battery comprising a lithium metal as a negative electrode, and a carrier compound for lithium ions as a positive electrode material having an oxidation potential differing from the negative electrode, is proposed as a high energy density. However, since such a battery has safety problems, now more commonly used is a lithium ion secondary battery having a negative electrode containing a carbonaceous material in which lithium ions undergo intercalation and deintercalation between carbon layers.

Since a lithium metal is not directly employed as the negative electrode in the lithium ion secondary battery using the carbonaceous material, the reaction between lithium of the negative electrode and electrolyte can be suppressed and a short circuit caused by the formation of dendrite on a surface of the lithium ions can be prevented. However, a capacity per gram is reduced according to the degree of intercalation the lithium ions undergo between the carbon layers. Accordingly, although it is necessary to use a carbon material able to intercalate/deintercalate a maximum amount of lithium ions, a theoretical capacity of only to 372 mAh/g is achieved in the case of the most highly developed graphite in the gaps between layers. In addition, irreversible capacity of about 10% occurs from a reaction between an organic electrolyte and a surface of the graphite or a reaction between the lithium ions and a cointercalated electrolytic material.

Accordingly, in order to increase the capacity of a carbon negative electrode, there is proposed a composite material enabling lithium intercalation at areas other than between carbon layers. The composite material is coated with metal alloyable with lithium. However, it is also problems that is hard to control the nature of the coating and to reduce the irreversible capacity.

SUMMARY OF THE INVENTION

The object of the present invention is to provide a carbonaceous material for a negative electrode of a lithium secondary battery which decreases an irreversible capacity and increases a discharge capacity of the battery. It is also an object of the present invention to provide a lithium secondary battery using the carbonaceous material.

These and other objects may be achieved by a carbonaceous material for a negative electrode of a lithium secondary battery, a surface of carbon particles of the carbonaceous negative electrode being coated with a porous nickel thin film, wherein a nickel adhesivity level for carbon is 0.05% by weight to 1.0% by weight.

BRIEF DESCRIPTION OF THE DRAWINGS

The accompanying drawings, which are incorporated in and constitute a part of this specification, illustrate an example of the invention, and, together with the description, serve to explain the principles of the invention.

DETAILED DESCRIPTION OF THE INVENTION

Figure 1:
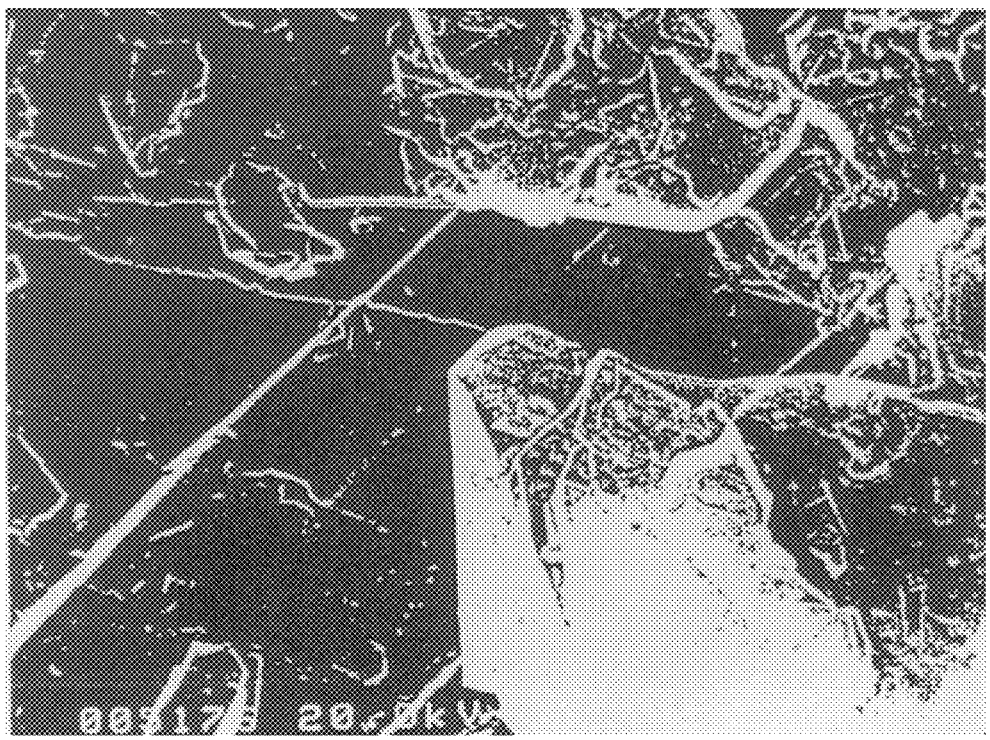
FIG. 1 is a SEM photograph showing the nature of a nickel thin film according to Example 2 of the present invention.

The inventors of the present invention have conducted research to decrease irreversible capacity and increase discharge capacity of the lithium secondary battery. It was found that there is an optimum range for a nickel adhesivity level to carbon, when a surface of carbon particles is coated with a porous nickel film. It is with such research that this invention was realized.

The object is achieved by providing a carbonaceous material for a negative electrode used in a lithium secondary battery in which the surface of carbon particles is coated with a porous nickel thin film, characterized in that the nickel adhesivity level to the carbon is between 0.05% by weight and 1.0% by weight.

When the nickel adhesivity level is within this range, the efficiency and discharge capacity of the battery are improved. However, if the nickel adhesivity level is excessively increased, due to the heavy weight of nickel, the discharge capacity per gram is decreased. Particularly, when the nickel adhesivity level is more than 1.0% by weight, discharge capacity and efficiency are decreased to levels lower than in the case of 0% by weight.

The reason for the generation of such high levels of irreversible capacity of the first cycle is not known, although various theoretical explanations are provided. This is evidence that the cause of irreversible capacity is complex. The most accepted theory points to the formation of a lithium reaction product which does not contribute to the battery reaction, the reaction product being generated by reacting an organic electrolyte with the surface of carbon particles. This is confirmed by the fact that the surface of the carbon particles is covered with products of $Li_2CO_3$ and LiF during charging.

It is considered that another cause for irreversible capacity is the stabilization of lithium in a crystalline structure. The crystalline structure such as that found in graphite is characterized by a specific stage structure and the well-developed layered structure. It is known that electrolyte is intercalated with lithium ion between the layers, resulting in stabilizing the lithium ions. This is explained by the fact that disordering only the surface of graphite increases the charge and discharge ratio (efficiency) of the first cycle for the whole.

A functional group such as H or OH present in the carbonaceous material may be another cause for irreversible capacity. The disordered carbonaceous material has a high H/C ratio, and the H/C ratio decreases according to increases in the order degree of the material. As lithium trapped by the H group and OH group is related with efficiency, the carbon is ordered by high temperature calcination and also the H/C ratio is decreased. Lithium would be irreversible if it were intercalated into the space provided by deforming the carbon structure, so the contribution to efficiency is redundant.

In any case, it is preferable that the surface of carbon particles should not make contact with an organic electrolyte, and that the carbon particles are covered with amorphous thin film so as to decrease intercalation of lithium ion and electrolyte into the carbon layers. Accordingly, this allows for penetration of only lithium ion and also prevents penetration of the organic polymer. The methods for coating the carbon powder with metallic thin film include depositing, sputtering, nonelectrolytic plating, etc. Among these, nonelectrolytic plating is the most suitable for industrial purpose.

Hereinafter, the present invention is described referring to the following best mode.

Carbonaceous material is provided by forming a metallic film on a surface of a carbon particle, wherein the carbon particle is treated with a nonelectrolytic plating liquid comprising nickel, and wherein the carbonaceous material is treated with metal chlorides or metal composites in advance of the plating step.

To form a porous nickel thin film by nonelectrolytic plating, a zinc ion or lead ion having a high level of reducing strength is absorbed on a surface of carbon, thereby obtaining a metallic thin film of zinc ion or lead ion. Next, the zinc or lead is substituted with nickel having a low level of reducing strength. The substitution can be also performed, while maintaining the same efficiency, by using copper, palladium or silver.

Alloy plating is preferred for attaching nickel over substituting ion using zinc, etc. Particularly, by including an element such as B or P, the metallic layer becomes amorphous such that a more porous nickel thin film can be obtained. The metallic thin film according to the present invention decreases the direct reaction between electrolyte and the surface of carbon, and provides a composite material effect, which is differentiated from a metallic thick film. In addition to B or P, it is possible to get the same effect using a metallic film comprising a small amount of (a) a transition metal such as Al, Si, Ga, Ge, In, Sb, Bi, As, Zn, Cd, which are capable of being alloyed with lithium; (b) a metal of group 1 or group 2 of the periodic table; or (c) a nonmetallic atom such as O, N, F, and S. Furthermore, it is possible to use vapor deposition, CVD (chemical vapor deposition) or plasma vapor deposition methods for forming metal thin film on the carbon particles.

As a plating treatment agent displaying the above-mentioned effect, it is preferable to use an aqueous solution of metal ions having a high level of reducing strength such as stannous chloride, lead dichloride, chromous chloride, titanous chloride, stannous acetate, plumbous acetate, chromous acetate, mercurous acetate, etc. In addition, as a nonelectrolytic plating bath, it is possible to use nickel, copper, platinum, silver, chrome, etc.; and as a composite (alloy) plating bath, it is possible to use nickel-boron, nickel-potassium, nickel-iron, etc.

In another aspect of the present invention, there is provided a lithium secondary battery using carbonaceous material as a negative electrode.

The constitution for each component of the inventive lithium secondary battery is as follows:

Electrolyte

It is possible to use a solution of lithium salt such as $LiPF_6$, $LiBF_4$, $LiClO_4$, $LiCF_3SO_4$, $LiAsF_6$, etc. in a solvent such as ethylene carbonate, propylene carbonate, dimethyl carbonate, dimethoxy ethane, tetrahydro furan or a mixture thereof; or as a solid electrolyte, it is possible to use the organic solvent added as a plasticizer to a mixture of, for example, the lithium salt and polyacryl nitrile.

Carbonaceous Negative Electrode

It is possible to use a synthetic graphite, a natural graphite, a mesophase low temperature calcination carbon, a graphite carbon fiber, a thermal expansion carbon (gaseous phase growing carbon), or an amorphous hard carbon. The amorphous hard carbon utilizes as a raw material a furfuryl resin, a phenol resin, a petrol pitch bridged by oxygen, a heavy oil, naphthalene, etc.

Positive Electrode

Although there are no particular restrictions for the positive electrode, it is possible to use the following well known in the art: transition metal based oxides, metal chalcogenides, metal halides, etc. Preferably, the transition metal includes cobalt, nickel, manganese, iron, chrome, titanium, vanadium, molybdenum, and the compound includes $LiCoO_2$, $LiMnO_2$, $LiNiO_2$, $LiNi_{1-x}Co_xO_2$, $LiNi_{1-x-y}Co_xM_yO_2$ (M is a trivalency metal or a transition metal).

The lithium secondary battery according to the present invention reduces the irreversible capacity of the first cycle resulting in increasing the discharge capacity, and by improving conductivity, large current and cycle characteristics are enhanced.

The followings are illustrative examples of the invention. The invention can be utilized in various ways and is not intended to be limited to the following examples.

EXAMPLE 1

2 g of graphite were washed with 10cc of 0.5 N of a sulfuric acid solution for 10 minutes then further washed with water. Subsequently, a TPC sensitizer ($SnCl_2$) liquid, which is manufactured by Okuno Chemical Industries, was diluted at a 1:10 ratio with the water to obtain a 200 cc solution. The graphite powder was mixed, agitated at 20–30° C. and treated for about 30 minutes. Zinc adsorption powder was then mixed in a liquid mixture of 60 cc of TCP Chemical Nickel A Liquid, 60 cc of B Liquid (containing phosphorous) and 240 cc of water. The resulting mixture was agitated at 35° C. for 1 hour. Next, the plating carbon powder was filtered, sufficiently washed with water then dried overnight at 120° C.

10% of a polyvinylidene fluoride (PVDF) was added to the powder and the mixture was mixed, after which N-methylpyrrolidone (NMP) of 5 times the PVDF was added to produce a slurry. The slurry was then coated on a 15 micron thick copper leaf using a Doctor Blade Method to obtain an electrode plate having thickness of 100 microns. A plurality of apertures of a predetermined size was formed in the electrode plate, thereby producing a carbonaceous electrode.

After the above, using a lithium metal as a counter electrode, a propylene carbonate/ethylene carbonate mixture containing 1 mol/l of $LiPF_6$ as electrolyte, and a polypropylene based separator, "Celgard" manufactured by Hexit Celasnease, as a separator, charging/discharging was performed in a range between 0 and 2 V. The data for nickel adhesivity, and discharge capacity and efficiency are shown in Table 1. Here, the nickel adhesivity corresponds to an assay value of an ICP spectrophotometer (also the case for the following examples and comparative examples).

EXAMPLE 2

The electrode was manufactured in the same way and the charging/discharging was carried out under the same conditions as Example 1 except that the zinc-absorption treatment was not performed, a nickel-boron liquid (Japan Kanigen Co., Ltd., SB-55) was used instead of the nickel plating liquid, and treating was performed at 60° C. for 1 hr. The results are shown in Table 1. Further, the nature of the nickel thin film was observed with a Scanned Electronic Microscope, and the results are shown in FIG. 1.

EXAMPLE 3

Except for the use of a nickel-phosphorus liquid (available from Japan Kanigen Co., Ltd., SUMER-S680), instead of the nickel-boron liquid of Example 2, the electrode was manufactured in the same manner as described in Example 1. The results are shown in Table 1.

EXAMPLE 4

Except for adsorbing Sn using TPC sensitizer ($SnCl_2$), the electrode was manufactured in the same manner as described in Example 1. The results are shown in Table 1.

Comparative Example 1

The manufacture of the electrode was carried out under the same conditions as Example 1 except graphite, which was not subjected to a surface treating process, was used.

Comparative Example 2

Figure 2:
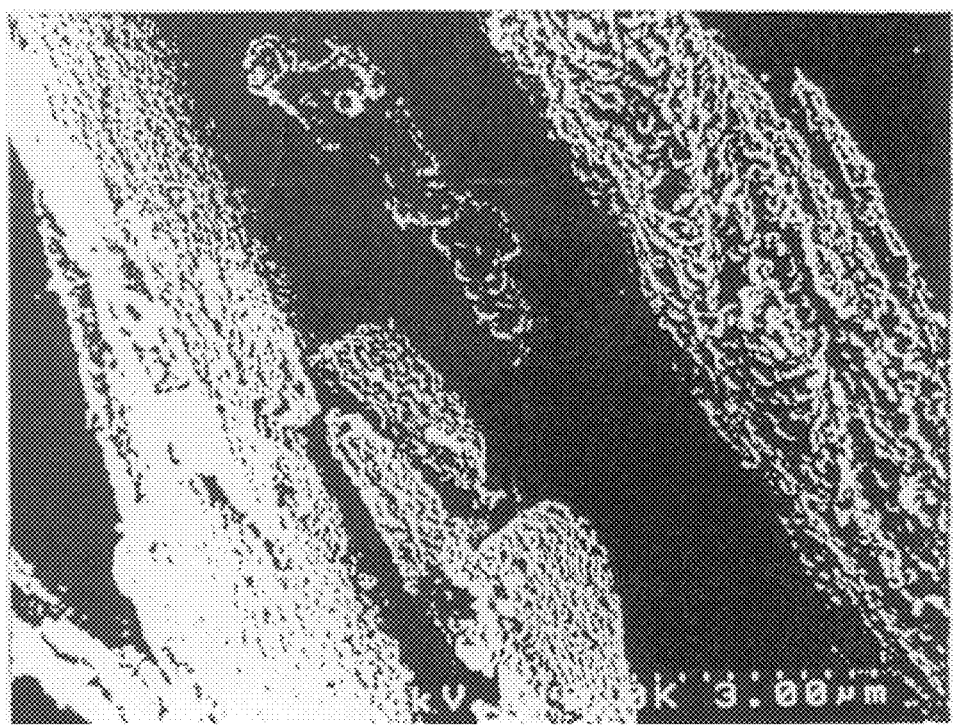
FIG. 2 is a SEM photograph showing the nature of a nickel thin film according to Comparative Example 2.

The manufacture of the electrode was carried out under the same conditions as Example 2 except a concentration of plating liquid was 2-times that in Example 2 and the treatment temperature was 75° C. The results are shown in Table 1. Further, the nature of the nickel film was observed with a SEM, and the results are shown in FIG. 2.

Comparative Example 3

The manufacture of the electrode was carried out under the same conditions as Example 2 except a concentration of plating liquid was 1.5 times that in Example 2, and the treatment temperature was 65° C. The results are shown in Table 1.

TABLE 1

|  | Nickel adhesivity level (%) | Discharge capacity) (mAh/g) | Efficiency (%) |
| --- | --- | --- | --- |
| Example 1 | 0.33 | 397 | 90.1 |
| Example 2 | 0.30 | 400 | 88.0 |
| Example 3 | 0.28 | 385 | 89.8 |
| Example 4 | 0.11 | 385 | 87.1 |
| Comparative Example 1 | 0 | 374 | 86.1 |
| Comparative Example 2 | 20.8 | 270 | 82.3 |
| Comparative Example 3 | 2.0 | 360 | 85.0 |

Referring Table 1, by employing nickel adhesivity levels within the range of the present invention, the secondary batteries of the present invention display markedly improved efficiency and discharge capacity over the batteries using nickel adhesivity levels not falling within the range of the present invention.

As described in the above, by using the inventive carbonaceous material surface-improved with nickel adhesivity levels as a negative electrode, conductivity, it is possible to manufacture discharge capacity, and discharge efficiency of the first cycle are improved. Therefore, it is possible to manufacture lithium secondary batteries having large electric current characteristics and improved cycle characteristics. Further, it is easy to adjust efficiency levels and adjust to the positive electrode, as well as to employ various designs to the negative and positive electrodes.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A carbonaceous material for a negative electrode of a lithium secondary battery, the carbonaceous material comprising a surface of carbon particles of the carbonaceous material and a porous nickel thin film disposed on the surface of carbon particles, wherein the nickel film comprises 0.05% by weight to 1.0% by weight of the carbonaceous material.

2. The carbonaceous material according to claim 1, wherein the surface of the carbon particles coated with the nickel thin film is provided by treating the carbon particles with a nonelectrolytic plating solution including nickel.

3. The carbonaceous material according to claim 2, wherein in advance of the nonelectrolytic plating treatment, the carbon particles are treated with metal chloride or metallic complex salt.

4. A lithium secondary battery comprising a negative electrode which is prepared by the carbonaceous material of any of claims 1 to 3.

* * * * *